US012585543B2

(12) United States Patent
Fox et al.

(10) Patent No.: US 12,585,543 B2
(45) Date of Patent: Mar. 24, 2026

(54) CODE COMMIT FACILITY FOR A CONTINUOUS INTEGRATION CONTINUOUS DEPLOYMENT SYSTEM

(71) Applicant: INTERNATIONAL BUSINESS MACHINES CORPORATION, Armonk, NY (US)

(72) Inventors: Jeremy R. Fox, Georgetown, TX (US); Laurentiu Gabriel Ghergu, Bucharest (RO); Logan Bailey, Atlanta, GA (US); Zachary A. Silverstein, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 18/595,514

(22) Filed: Mar. 5, 2024

(65) Prior Publication Data

US 2025/0284591 A1     Sep. 11, 2025

(51) Int. Cl.
      *G06F 11/14*          (2026.01)
      *G06F 8/65*           (2018.01)
                (Continued)

(52) U.S. Cl.
      CPC ............ G06F 11/1433 (2013.01); G06F 8/65 (2013.01); G06F 8/71 (2013.01); G06F 11/0766 (2013.01)

(58) Field of Classification Search
      CPC .......... G06F 11/1433; G06F 8/65; G06F 8/71; G06F 11/0766; G06F 8/60; G06F 8/311;
                (Continued)

(56) References Cited

U.S. PATENT DOCUMENTS

| | | | |
|---|---|---|---|
| 8,776,014 B2 | 7/2014 | Arnott et al. | |
| 9,588,876 B2 | 3/2017 | Swierc et al. | |
| (Continued) | | | |

OTHER PUBLICATIONS

Microsoft, "Release and work item insights", Microsoft, Nov. 2023, pp. 1-6.

(Continued)

*Primary Examiner* — Thuy Dao
(74) *Attorney, Agent, or Firm* — Rakesh Roy, Esq.; Kevin P. Radigan, Esq.; Heslin Rothenberg Farley & Mesiti P.C.

(57)                ABSTRACT

A code commit facility is provided operatively coupled to a continuous integration continuous deployment system to assist in addressing a failing code change during updating of a software application. The code commit facility includes generating discrete code change packages from the failing code change by separating independent code change files of the failing code change into the discrete code change packages. Further, the code commit facility deploys the discrete code change packages and based on the deploying, detects a failing discrete code change package. Based on detecting the failing discrete code change package, the code commit facility rolls back one or more code change files of the failing package, absent rolling back one or more other code change files of one or more other discrete code change packages to restructure the failing code change for deployment using the continuous integration continuous deployment system.

20 Claims, 9 Drawing Sheets

400

COMPUTING RESOURCE(S) ~410
                        ~412
PROGRAM CODE
                ~414
COGNITIVE AGENT

DATA SOURCES

MACHINE LEARNING MODELS

~416

420

SOLUTION(S)/ RECOMMENDATION(S)/ ACTION(S) ~430

(51) Int. Cl.

| | |
|---|---|
| *G06F 8/71* | (2018.01) |
| *G06F 9/44* | (2018.01) |
| *G06F 9/45* | (2006.01) |
| *G06F 11/07* | (2006.01) |
| *G06F 11/36* | (2025.01) |

(58) Field of Classification Search
CPC .... G06F 9/54; G06F 11/3409; G06F 11/3698; G06F 8/30; G06F 11/3688; H04L 67/10
See application file for complete search history.

(56) References Cited

U.S. PATENT DOCUMENTS

| | | | |
|---|---|---|---|
| 10,990,514 | B2 | 4/2021 | Magnezi et al. |
| 11,200,377 | B2 | 12/2021 | Benedict et al. |
| 11,900,275 | B2 * | 2/2024 | Negussie ............... G06N 20/00 |
| 12,072,790 | B1 * | 8/2024 | Pearson .............. G06F 11/3676 |
| 2004/0194060 | A1 | 9/2004 | Ousterhout et al. |
| 2010/0050156 | A1 | 2/2010 | Bonanno et al. |

OTHER PUBLICATIONS

IBM Cloud Education, "What Are CI/CD and the CI/CD Pipeline?", IBM, Sep. 27, 2021, pp. 1-8.

Casper Boone et al., "Fixing Continuous Integration Tests From Within the IDE With Contextual Information", International Conferences on Program Comprehension, May 16-17, 2022, pp. 287 to 297.

Eero Kauhanen et al. "Regression Test Selection Tool for Python in Continuous Integration Process", University of Helsinki Institutional Repository. Mar. 2021, pp. 1-5.

\* cited by examiner

100

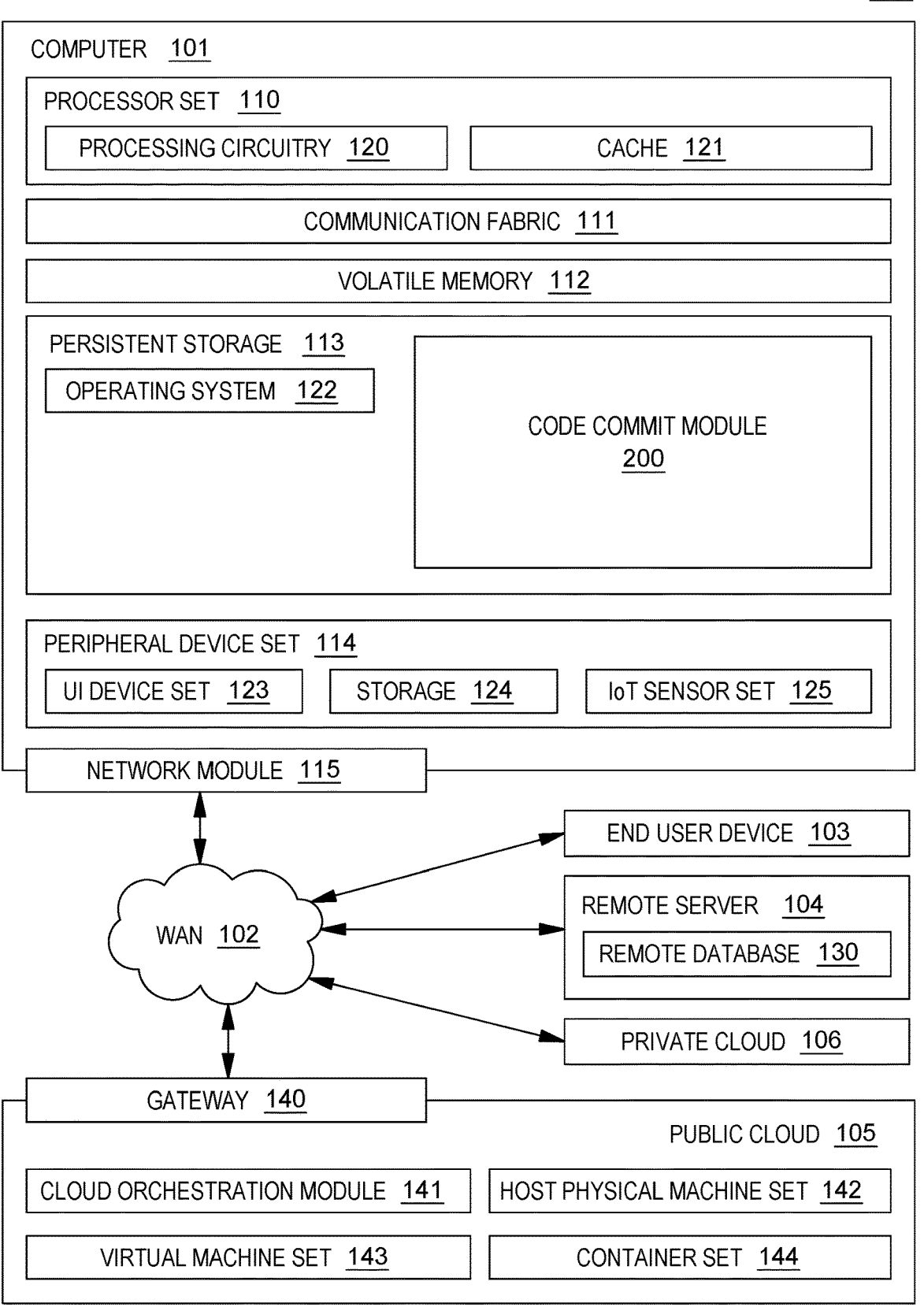

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

CODE COMMIT MODULE 200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

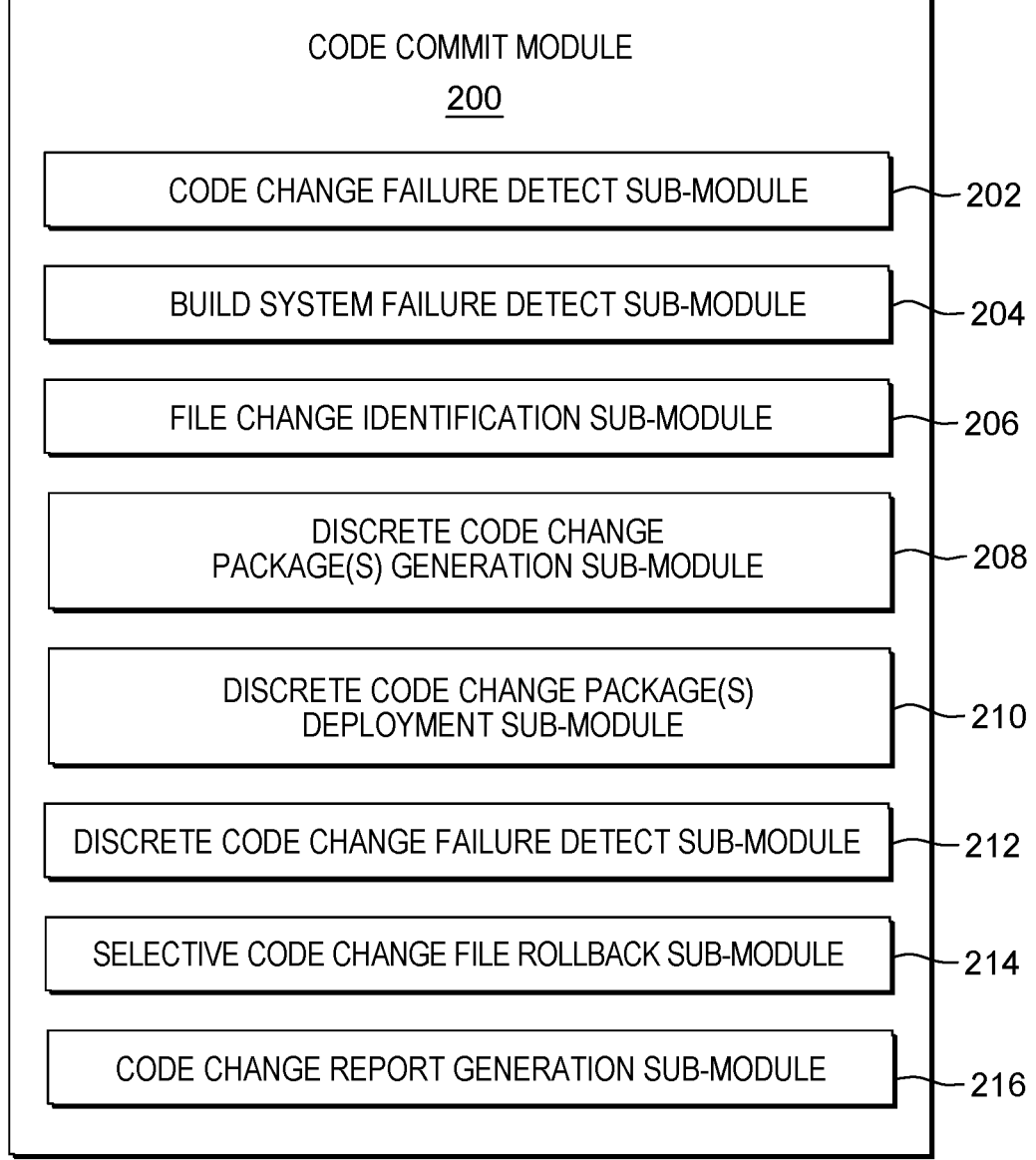

CODE COMMIT MODULE
200

CODE CHANGE FAILURE DETECT SUB-MODULE — 202

BUILD SYSTEM FAILURE DETECT SUB-MODULE — 204

FILE CHANGE IDENTIFICATION SUB-MODULE — 206

DISCRETE CODE CHANGE
PACKAGE(S) GENERATION SUB-MODULE — 208

DISCRETE CODE CHANGE PACKAGE(S)
DEPLOYMENT SUB-MODULE — 210

DISCRETE CODE CHANGE FAILURE DETECT SUB-MODULE — 212

SELECTIVE CODE CHANGE FILE ROLLBACK SUB-MODULE — 214

CODE CHANGE REPORT GENERATION SUB-MODULE — 216

FIG. 2

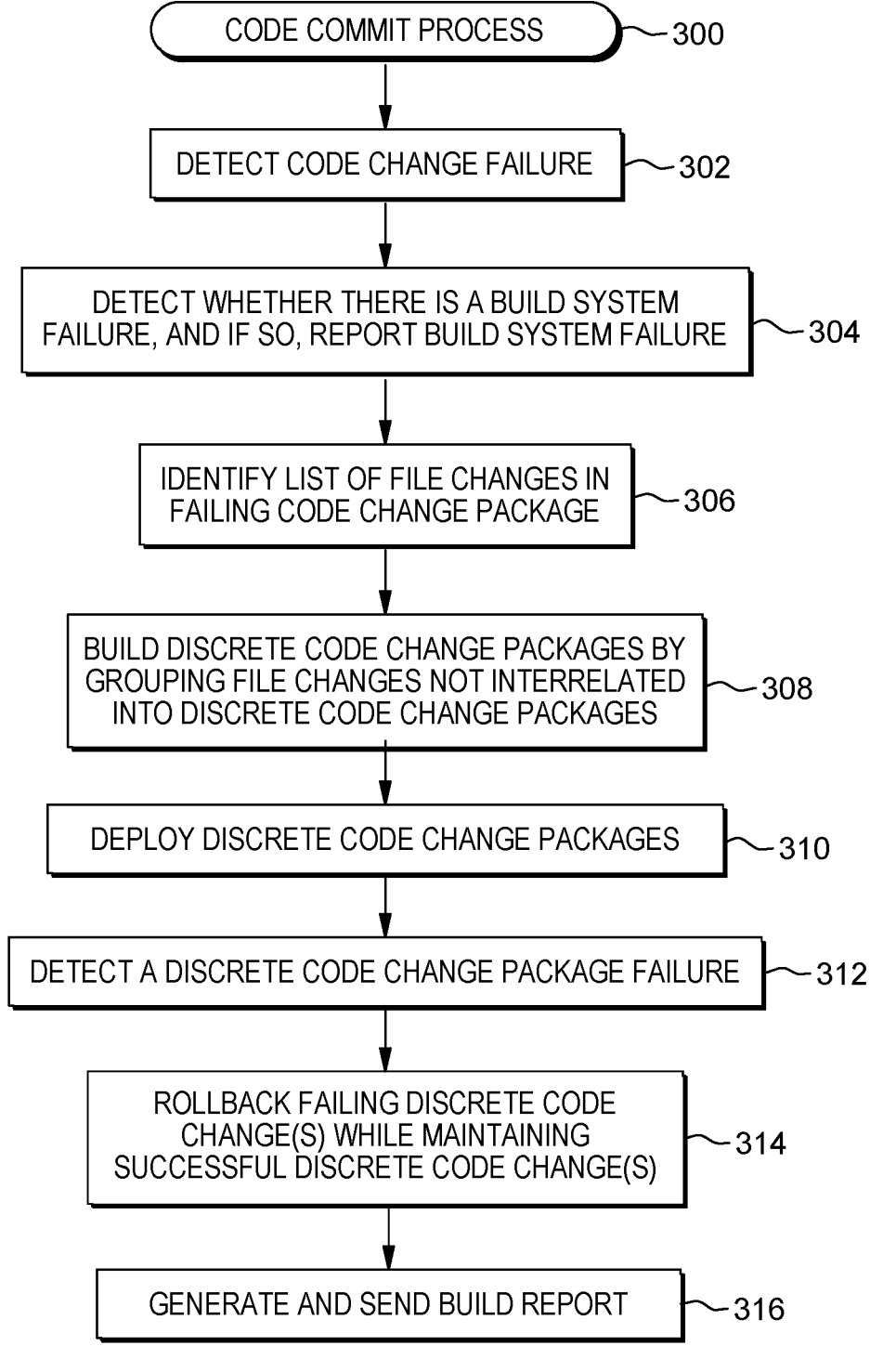

CODE COMMIT PROCESS ~300

DETECT CODE CHANGE FAILURE ~302

DETECT WHETHER THERE IS A BUILD SYSTEM FAILURE, AND IF SO, REPORT BUILD SYSTEM FAILURE ~304

IDENTIFY LIST OF FILE CHANGES IN FAILING CODE CHANGE PACKAGE ~306

BUILD DISCRETE CODE CHANGE PACKAGES BY GROUPING FILE CHANGES NOT INTERRELATED INTO DISCRETE CODE CHANGE PACKAGES ~308

DEPLOY DISCRETE CODE CHANGE PACKAGES ~310

DETECT A DISCRETE CODE CHANGE PACKAGE FAILURE ~312

ROLLBACK FAILING DISCRETE CODE CHANGE(S) WHILE MAINTAINING SUCCESSFUL DISCRETE CODE CHANGE(S) ~314

GENERATE AND SEND BUILD REPORT ~316

FIG. 3

FROM FIG. 7A

FACILITY RE-DEPLOYS THE SEPARATE CODE
CHANGE PACKAGES, AND CHECKS EACH IF
DEPLOYMENT SUCCEEDS OR FAILS (AND REPORTS
IDENTITY OF ANY FAILING CODE CHANGE )    ~714

FACILITY GENERATES FINAL BUILD
REPORT ON DEPLOYED CODE
CHANGE PACKAGE(S)    ~716

CODE COMMIT FACILITY FOR A CONTINUOUS INTEGRATION CONTINUOUS DEPLOYMENT SYSTEM

BACKGROUND

One or more aspects relate, in general, to enhancing processing within a computing environment, and more particularly, to providing a code commit facility for enhancing a continuous integration continuous deployment system.

In application development and operations (DevOps), continuous integration/continuous deployment (CI/CD) streamlines application coding, testing and deployment by, for instance, providing developer systems a single repository for storing work and automation tools to consistently combine and test the code to ensure that the code works. In operation, continuous integration/continuous deployment is iterative, rather than linear, and allows DevOps teams to write code, integrate the code, run tests, deliver releases and deploy changes to a software application collaboratively in real time. In application, CI/CD systems can be used to automate the build and deployment process of the software application.

SUMMARY

Certain shortcomings of the prior art are overcome, and additional advantages are provided herein through the provision of a computer-implemented method of facilitating processing within a computing environment. The computer implemented method includes operative coupling a code commit facility to a continuous integration continuous deployment system, where the code commit facility assists in addressing a failing code change during updating of a software application by the continuous integration continuous deployment system. The code commit facility includes generating discrete code change packages from the failing code change, where generating the discrete code change packages includes separating independent code change files of the failing code change into the discrete code change packages. Further, the facility includes deploying the discrete code change packages in a target environment using the continuous integration continuous deployment system, and based on the deploying, detecting within the target environment a failing discrete code change package. In addition, the facility includes rolling back, based on detecting the failing discrete code change package, one or more code change files of the failing discrete code change package absent rolling back one or more other code change files of one or more other discrete code change packages to restructure the failing code change for deployment using the continuous integration continuous deployment system.

Computer program products and computing systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to include and/or use one or more aspects of the present disclosure;

FIG. 2 depicts one embodiment of a computer program product with a code commit module, in accordance with one or more aspects of present disclosure;

FIG. 3 depicts one embodiment of a code commit process, in accordance with one or more aspects of the present disclosure;

DETAILED DESCRIPTION

Figure 4:
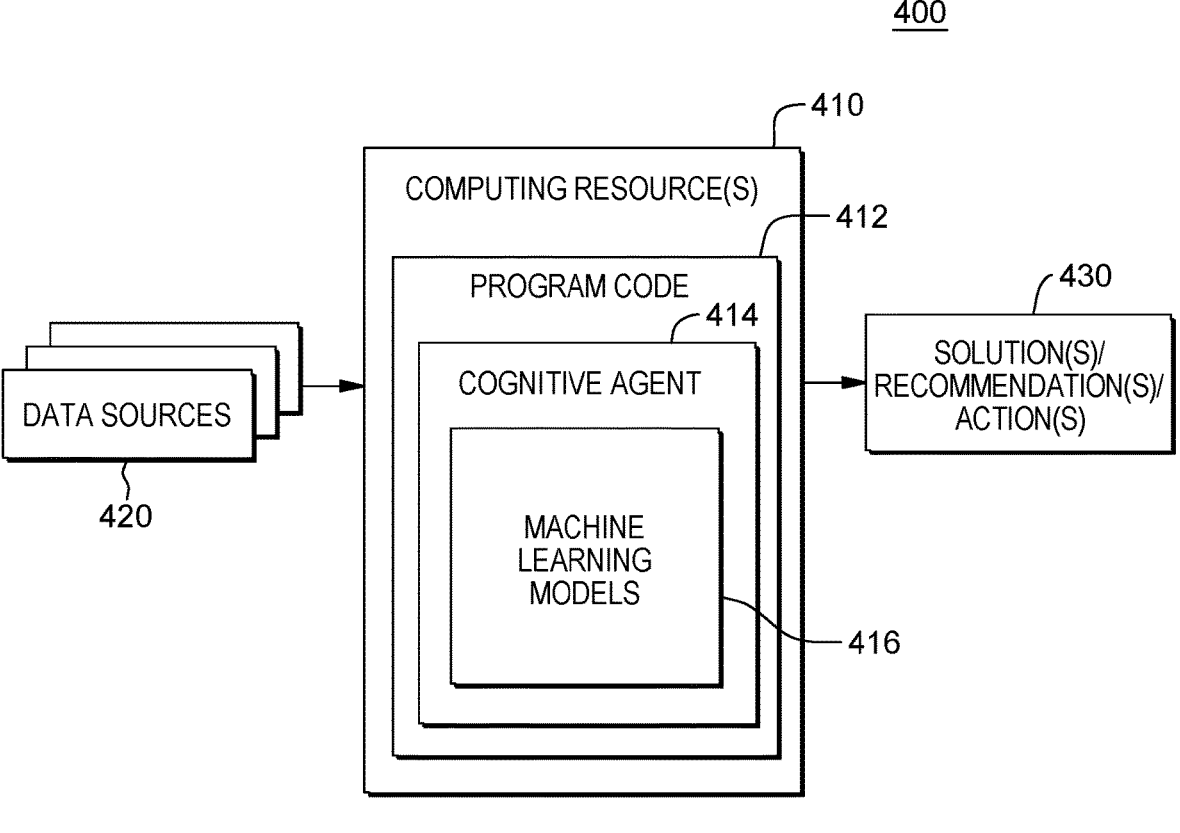
FIG. 4 is a further example of a computing environment to include and/or use one or more aspects of present disclosure.

Aspects of the present disclosure and certain features, advantages, and details thereof, are explained more fully below with reference to the non-limiting example(s) illustrated in the accompanying drawings. Descriptions of well-known systems, devices, tools, processing techniques, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, where the same or similar reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, systems, or tools only as examples, and not by way of limitation. Furthermore, the illustrative embodiments are described in certain instances using particular software, hardware, tools, and/or data processing environments only as example for clarity of description. The illustrative embodiments can be used in conjunction with other comparable or similarly purposed structures, systems, applications, architectures, etc. One or more aspects of an illustrative control embodiment can be implemented in software, hardware, or a combination thereof.

As understood by one skilled in the art, program code, as referred to in this application, can include software and/or hardware. For example, program code in certain embodiments of the present disclosure can utilize a software-based implementation of the functions described, while other embodiments can include fixed function hardware. Certain embodiments combine both types of program code. Examples of program code, also referred to as one or more programs, are depicted in FIG. 1, including operating system 122 and code commit module 200, which are stored in persistent storage 113.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one or more processor sets, each with one processor or multiple processors, and/or any other type of environment and/or configuration, etc., that is capable of executing a process (or multiple processes) that, e.g., perform code commit processing such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code commit module 200. In addition to code commit module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code commit module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in module 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in module 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 1 need not be included in the computing environment and/or are not used for one or more aspects of the present disclosure. Further, in one or more embodiments, additional and/or other components/modules can be used. Other variations are possible.

By way of example, one or more embodiments of a code commit module, process or facility are described initially with reference to FIGS. 2-3. FIG. 2 depicts one embodiment of code commit module of facility 200 that includes code or instructions to perform code commit processing, in accordance with one or more aspects of present disclosure, and FIG. 3 depicts one embodiment of a code commit process, in accordance with one or more aspects of present disclosure.

Referring to FIGS. 1-2, code commit module 200 includes, in one example, various sub-modules used to perform processing, in accordance with one or more aspects of the present disclosure. The sub-modules are, e.g., computer-readable program code (e.g., instructions) and computer-readable media (e.g., persistent storge (e.g., persistent storage 113, such as a disk) and/or a cache (e.g., cache 121), as examples). The computer-readable media can be part of a computer program product and can be executed by and/or using one or more computers, such as computer(s) 101; one or more processor sets 110 (FIG. 1); processors, such as one or more processors of processor set 110; and/or processing circuitry, such as processing circuitry of processor set 110, etc.

As noted, FIG. 2 depicts one embodiment of a code commit module 200, which includes, or facilitates, code commit processing in accordance with one or more aspects of present disclosure. In the embodiment of FIG. 2, example sub-modules of code commit module 200 include a code change failure detect sub-module 202 to detect a failing code change, such as a CI/CD system build or deployment failure of a code package with one or more code changes. In addition, code commit module 200 includes, in one or more embodiments, a build system failure detect sub-module 204 to ascertain whether the detected failure is a result of a build system failure, or CI/CD system failure. In one or more embodiments, code commit module 200 further includes a file change identification sub-module 206 to identify the code change files associated with the failing code change, and a discrete code change package(s) generation sub-module 208 to construct discrete code change packages, that is, test code packages containing code files which are not interrelated. In embodiments, code commit module 200 further includes a discrete code change package(s) deployment sub-module 210 to deploy the code changes rearranged in the discrete test code change packages, and a discrete code change failure detect sub-module 212 to detect a test code change package failure. In one or more embodiments, code commit module 200 further includes a selective code change file rollback sub-module 214 to selectively rollback one or more code change files of the failing test code change package, without (or absent) rolling back one or more other code change files of successfully deployed test code change packages for use in restructuring the failing code change for deployment. In addition, code commit module 200 includes a code change report generation sub-module 216 to generate, for instance, a code change report and to send the report to one or more control or management systems overseeing, for instance, the software application, continuous integration continuous deployment system and/or the computing environment.

Note that although various sub-modules are described herein, code commit module processing, such as disclosed, can use, or include, additional, fewer, and/or different sub-modules. A particular sub-module can include additional code, including code of other sub-modules, or less code. Further, additional and/or fewer sub-modules can be used. Many variations are possible.

Advantageously, in one or more aspects, improved processing within a computing environment is provided herein by operatively coupling a code commit module, process or facility to an automated continuous integration/continuous deployment system or tool to facilitate continuous updating and deployment of software application code changes within the computing environment, as well as handling of any failing code change. The code commit facility disclosed reduces downtime in the case of a code change failure by, for instance, allowing one or more non-failing files of a code change set to proceed, while rolling back one or more identified failing files of the code change set. Advantageously, the code commit processing disclosed reduces analysis time and facilitates understanding of a root cause of a code change issue, such as a code change build or deployment issue. In addition, the code commit processing disclosed can facilitate identifying and signaling existence of a build system failure (when present) that resulted in a particular code change build or deployment issue.

In one or more embodiments, the code commit module is used, in accordance with one or more aspects of the present disclosure, to perform code commit-related processing. FIG. 3 depicts one example of a code commit process 300, such as disclosed herein. The process is executed, in one or more embodiments, by a computer (e.g., computer 101 (FIG. 1)), and/or one or more processor sets, such as a processor or processing circuitry (e.g., of processor set 110 of FIG. 1). In one example, code or instructions implementing the process, are part of a facility or module, such as code commit module 200. In other examples, the code can be included in one or more other modules and/or one or more other sub-modules of the one or more other modules. Various options are available.

As illustrated in FIG. 3, in one example, code commit process 300 executing on one or more computers (e.g., computer 101 of FIG. 1), one or more processor sets (e.g., processor set 110 of FIG. 1, such as a processor of processing circuitry of the processor set) detects a code package failure 302. In one or more embodiments, detecting a code change failure can be an automated process to detect presence of a build or deployment issue with a code change. Detecting a failure issue can be implemented using a variety of approaches including, for instance, training and using a machine learning model to detect a failure occurrence, detecting presence of one or more application programing interface (API) error codes, using time locked state validation and/or other analysis components of the system. In one or more embodiments, code commit process 300 further includes detecting whether there is a build system failure, and if so, reporting the build system failure 304, such as reporting to one or more systems that a failure is resulting from a build system failure, and not a code-related issue. In one or more embodiments, detecting the build system failure can include decrementing a change set number or version number and repeating the building or deploying process with the code change of the decremented change set number, and ascertaining whether the prior code change set also fails. This process can be repeated, for instance, x times (where x≥2), and upon detection of x consecutive change set fails, the code commit process can notify the one or more systems of the presence of the build system failure.

In one or more embodiments, code commit process 300 further includes identifying a list of code change files in the failing code change. For instance, in one or more embodiments, a list of file changes can be obtained using a history view of the version control system of the CI/CD system for the selected branch of the code change. In embodiments, code commit process 300 further includes building discrete test code change packages by separating file changes not interrelated into different test code change packages 308, and deploying the discrete test code change packages 310 to determine which discrete code change package(s) fails 312. In one or more embodiments, the code commit process 300 includes, upon detecting a discrete code change package failure 312, rolling back any failing code change files of the package, while maintaining code change files of the successfully deployed discrete test code change packages 314. In this manner, the failing code change is restructured for deployment via the continuous integration continuous deployment system. The code commit process 300 further includes, in one or more embodiments, generating and forwarding a build report to, for instance, one or more developer systems and/or central control systems of the computing environment 316.

Continuous integration/continuous deployment encompasses a processing tool or system for automating software application build and deployment. A continuous integration/continuous deployment pipeline is, for instance, a development and operations (DevOps) streamlining pipeline that focuses on frequent and reliable software delivery processes. Continuous integration allows developers to work independently, creating their own coding (branches) to implement small changes to the software application. The individual coding work is then pushed into an automated system that uses scripts to build and test the code changes. After the build stage, a continuous integration server or tool compiles the source code changes into the master code. The continuous testing implemented by the continuous integration offers faster code fixes, and insures functionality, and ultimately better collaboration and software quality results. Continuous deployment, including continuous delivery, can include, in one or more embodiments, deploying the finalized code changes into a target environment, such as a production environment. The application software, and any related application programing interfaces are tested, and any update errors can be resolved, for instance, through an automated process such as disclosed herein.

As noted, exiting continuous integration/continuous deployment (or delivery) tools or systems can be used to automate the deployment process of a software application. These computer integration/computer deployment systems are usually integrated with a source code repository that the system uses to build the deployment package from a specific branch of the source code. In cases where a build or deployment failure occurs, the CI/CD system typically sends an alert to an administrator system informing the administrator that the current build or deployment process has failed. The report typically does not contain any additional information, and in certain cases, such as production deployment failures, the system will remain in an inconsistent state with the application being down for a period of time while the failure is being resolved. For certain specific technologies, such as low code development platforms, a failed build process can be even harder to debug because the platform(s) typically has proprietary build systems and developers only have access to high level abstractions of the code. For instance, currently available low code development platforms can be an all-in-one high productivity rapid application development platform that allows a user to create, deploy, maintain and improve mobile and/or web applications. It provides a facility to fast track the process of application delivery across a lifecycle management process, but again, typically only provides high level abstractions of the code.

An issue with available continuous integration/continuous deployment solutions is they do not have a process for insuring, or enhancing, continuity by providing developer systems with a more detailed view of the reason why a specific build has failed or an automated fix for when a deployment has failed. Disclosed herein are certain novel computer-implemented methods, computer program products and computer systems for facilitating processing within a computing environment, and more particularly, for providing a code commit facility for operatively coupling to a continuous integration/continuous deployment tool for more effective automated build and deployment of software application updates by, for instance, providing a more detailed view and a specific reason why a build process has failed or an automated code change has failed. In one or more embodiments, application execution continuity is enhanced by minimizing or eliminating downtime resulting from a failed code change, and/or enriching a failure report to more quickly identify a particular failing code change or code file at issue. In one more or more aspects, the code commit processing disclosed herein provides one or more enhanced reports for certain types of build and deployment systems, such as the increasingly popular low code development platforms, to provide the redundancy and safety of a full continuous integration continuous deployment pipeline.

By way of further explanation, FIG. 4 depicts another embodiment of a computing environment or system 400, which can incorporate, or implement, one or more aspects of an embodiment of the present disclosure. In one or more implementations, system 400 is implemented as part of, or includes, a computing environment, such as computing environment 100 described above in connection with FIG. 1. System 400 includes one or more computing resources 410, such as one or more computers 101 of FIG. 1, that execute program code 412 that implements, for instance, one or more aspects of a module, facility or process such as disclosed herein, and which can include an artificial intelligence agent or system 414, which utilizes one or more machine learning models 416, such as described herein. In one embodiment, data, such as error data, knowledge corpus database data, or other data associated with build and/or deployment successes and/or failures related to carrying out a build and deployment can be used by artificial intelligence agent 414 model(s) 416 to (for instance), detect and/or parse a failing code change package, and/or other related actions 430, etc., based on the particular application of the machine-learning model(s) to facilitate achieving one or more aspects of the code commit processing disclosed. In implementation, system 400 can include, or utilize, one or more networks for interfacing various aspects of computing resource(s) 410, as well as one or more data sources 420 providing data, and one or more components, systems, etc., receiving an output, action, etc., 430 of machine learning model(s) 416 to facilitate performance of one or more artificial intelligence agent operations. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model(s), such as discussed herein.

In one or more implementations, computing resource(s) 410 house and/or execute program code 412 configured to perform computer-implemented methods in accordance with one or more aspects of the present disclosure. By way of example, computing resource(s) 410 can be a computing-system-implemented resource(s). Further, for illustrative purposes only, computing resource(s) 410 in FIG. 4 is depicted as being a single computing resource. This is a non-limiting example of an implementation. In one or more other embodiments, computing resource(s) 410, which implements one or more aspects of processing such as discussed herein, can, at least in part, be implemented in multiple separate computing resources or systems, such as one or more computing resources of a cloud-hosting environment, by way of example.

Briefly described, in one embodiment, computing resource(s) 410 can include one or more processor sets with one or more processors, for instance, central processing units (CPUs). Also, the processor set(s) can include functional components used in the integration of program code, such as functional components to fetch program code from locations in such as cache or main memory, decode program code, and execute program code, access memory for instruction execution, and write results of the executed instructions or code. The processor set(s) can also include a register(s) to be used by one or more of the functional components. In one or more embodiments, the computing resource(s) can include memory, input/output, a network interface, and storage, which can include and/or access, one or more other computing resources and/or databases, as required to implement the artificial intelligence agent and machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s), or computing system(s) or competitor(s), which can implement one or more aspects disclosed are described further herein with reference to the figures.

As noted, in one embodiment, program code 412 includes, or executes, an artificial intelligence agent 414 which trains and utilizes one or more machine learning models 416. The models can be trained using training data that can include a variety of types of data, depending on the model and the data sources. In one or more embodiments, program code 412 executing on one or more computing resources 410 applies one or more algorithms of, for instance, artificial intelligence agent 414 to generate and train the model(s), which the program code then utilizes to, for instance, detect code change build and/or deployment issues or errors, as well as to identify deployment successes and failures to facilitate determining, for instance, state of one or more code change packages being processed by the continuous integration continuous deployment system. In an initialization or learning stage, program code 412 trains the one or more machine learning models 416 using obtained training data that can include, in one or more embodiments, error data, or other data to be used by the artificial intelligence agent workflow to, for instance, detect and/or parse a failing code change build or deployment.

Data used to train the model(s) (in one or more embodiments of the present disclosure) can include a variety of types of data, such as heterogeneous data (such as success-related data and/or error-related data) generated by one or more data sources and/or data stored in one or more databases accessible by, the computing resource(s). Program code, in embodiments of the present disclosure, can perform data analysis to generate data structures, including algorithms utilized by the program code to predict, detect and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 416, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weigh various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from, for instance, monitoring system actions relevant to the computing-based process, such as from a collection of error data, concepts/visual insights, tradeoff analytics, document conversion, and/or relationship extraction. In an embodiment, one or more programs can analyze the data obtained by the program code across various sources utilizing one or more of a natural language classifier, retrieve-and-rank application programming interfaces, and tradeoff analytics application programing interfaces, etc.

In one or more embodiments, the program code can utilize one or more neural networks to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present disclosure, can utilize in implementing a machine-learning model, such as described herein.

Figure 5:
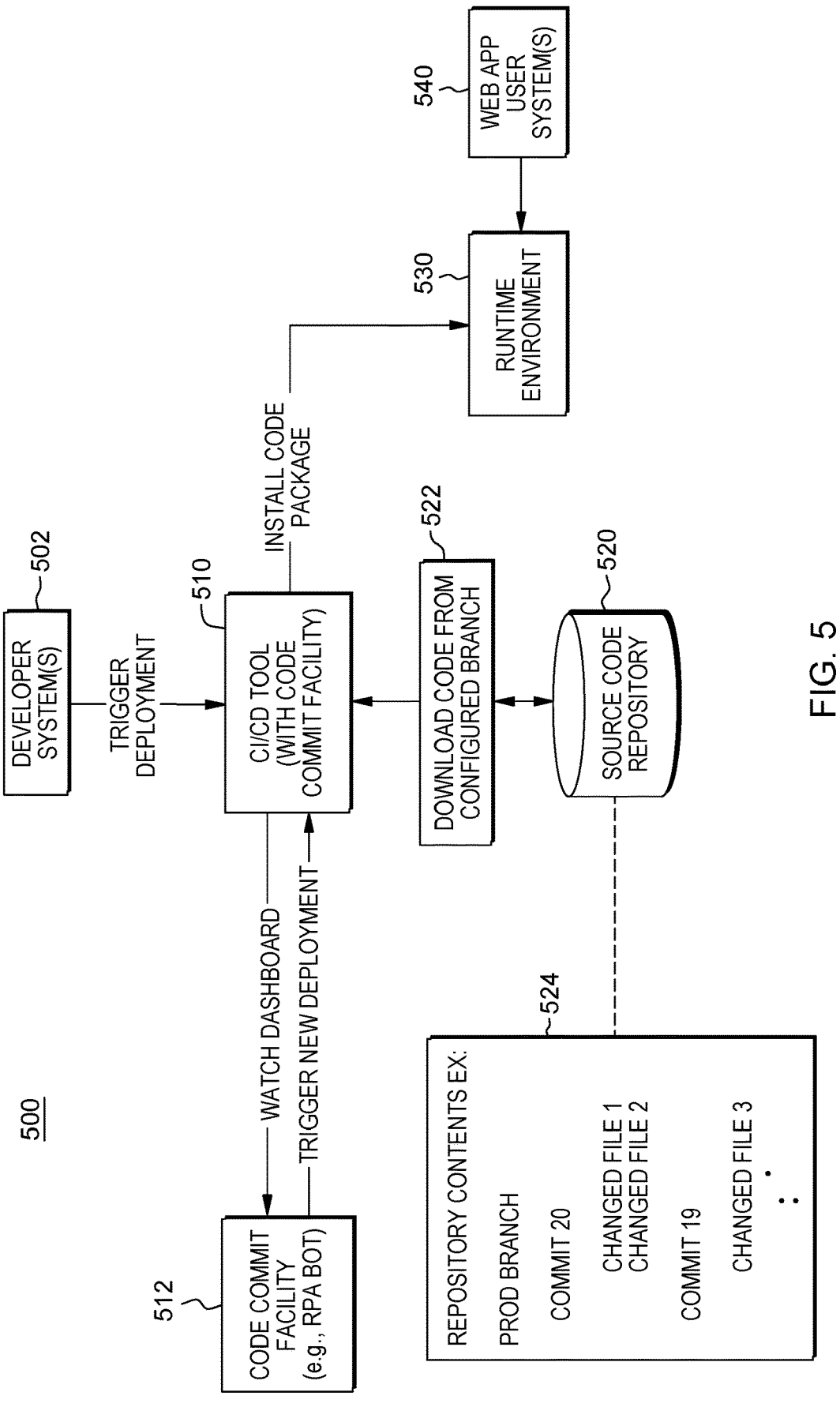
FIG. 5 is another example of a computing environment to include and/or use a code commit facility, in accordance with one or more aspects of present disclosure.

FIG. 5 depicts another example of a computing environment to include and/or use a code commit facility, module or process, in accordance with one or more aspects of present disclosure. In FIG. 5, a computing environment 500 is shown, which can incorporate, or implement, one or more aspects of an embodiment of the present disclosure. In one or more embodiments, computing environment 500 is implemented as part of, or includes, a computing environment such as computing environment 100 described above in connection with FIG. 1. Computing environment 500 includes one or more computing resources, such as one or more computers 101 of FIG. 1, that execute program code that implements one or more aspects of computing environment 500. As illustrated, computing environment 500 includes, by way of example, a continuous integration continuous deployment tool or system 510 which is accessed by one or more developer systems 502 to trigger a build and/or deployment of one or more code changes to a software application executing within a runtime environment 530 being accessed by one or more user systems 540, such as one or more web application user systems. In operation, continuous integration continuous deployment tool 510 accesses a source code repository 520 to, for instance, download code for a configured branch of the software application 522 based on the triggered code change build and/or deployment. As illustrated in FIG. 5, in one or more embodiments, source code repository 520 can include, in part, a code change history for different software branches of the code, with one or more commits indicating deployed code changes for the software application, and changed files indicating particular software file changes within the application software. In one or more embodiments, the commits have associated version numbers, as well as the code files being changed.

As illustrated in FIG. 5, computing environment 500 further includes a code commit facility 512 operatively coupled to continuous integration continuous deployment tool 510 and/or integrated, at least in part, within continuous integration continuous deployment tool 510. In one specific embodiment, code commit facility 512 is implemented as a robotic process automation (RPA) bot or application that can, in one or more embodiments, watch a dashboard of the continuous integration continuous deployment tool to identify a developer system requested code change, as well as to, for instance, trigger new deployments via the continuous integration continuous deployment tool 510 such as the discrete test deployments discussed herein. In embodiments, continuous integration continuous deployment tool 510 is further coupled to runtime environment 530 to, for instance, install code change packages for the software application within the runtime environment, and thereby facilitate the DevOps pipeline process.

In one or more aspects, the code commit facility disclosed herein can be implemented as a robotic process automation (RPA) based add-on for a continuous integration continuous deployment system or tool that will be executed when, for instance, a build pipeline fails to deploy a new code change into a target environment. Note that the target environment can be a production environment, development environment, test environment, user acceptance test (UAT) environment, etc. Advantageously, the code commit facility and process disclosed herein can be used with programing languages and systems that do not support automated DevOps pipelines due to missing application programing interfaces for navigating a propriety version control system where the main source code is maintained. For example, certain low code development platforms deployed in a private cloud scenario typically do not offer application programming interface access that allows scripts to automatically navigate the source code branches and trigger deployments. The code commit facility disclosure herein addresses this deficiency. In one or more embodiments, the code commit facility watches (e.g., continuously watches) the dashboard of the continuous interface continuous deployment tool, and detects if any build fails. In one or more other embodiments, the code commit change facility can also obtain deployment failure information via API calls when offered by the continuous interface continuous deployment tool or server. Where the code commit facility detects a code change package deployment failure, the facility can address the failure using a process or workflow such as described herein. Additionally, in one or more embodiments, the facility generates one or more reports (such as one or more failure reports) to, for instance, send to one or more developer systems that provide additional information including, for instance, the most likely file(s) that caused the deployment to fail. Advantageously, the code commit facility and process described herein minimizes the amount of downtime of the target computing environment building, testing, deploying, etc., the code changes for the software application.

Figure 6:
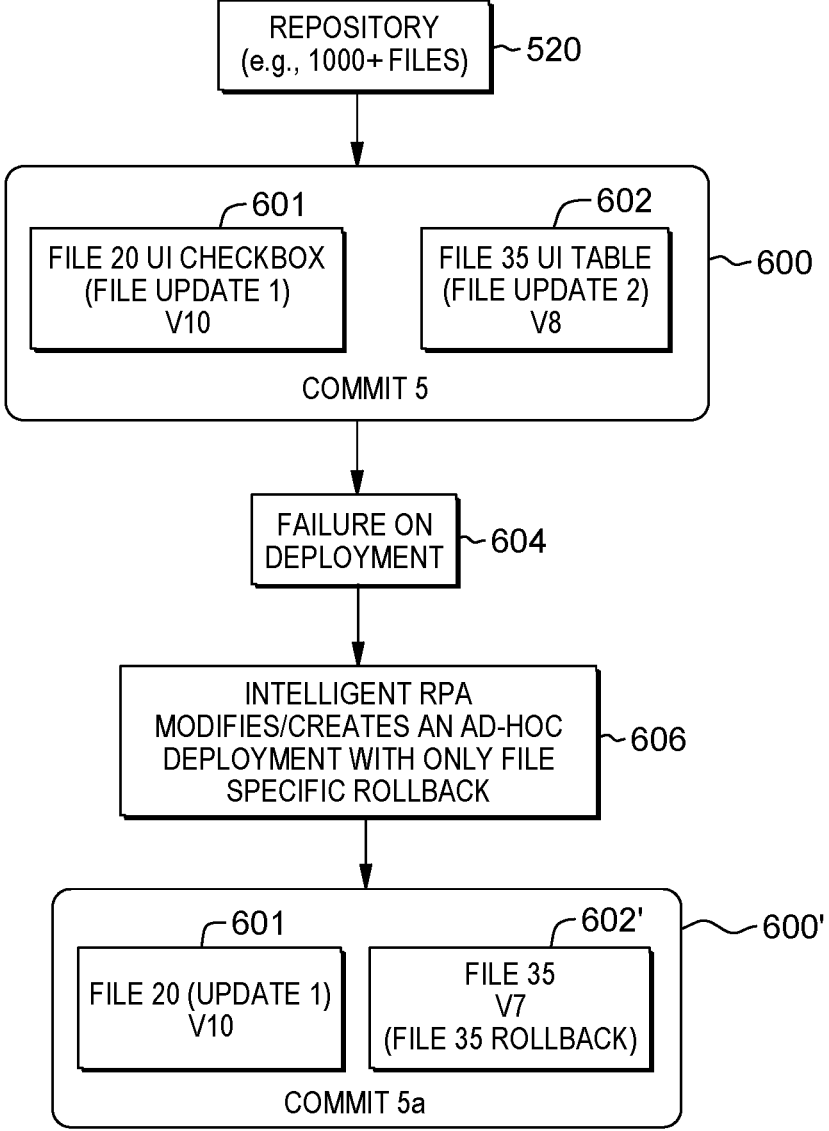
FIG. 6 is a further example of a code commit facility workflow, in accordance with one or more aspects of present disclosure.

FIG. 6 depicts one example of a code commit process, in accordance with one or more of the aspects of present disclosure. In FIG. 6, source code repository 520 is accessed and used in building a code change commit 600, labeled commit 5, by way of example. In the example, code change commit 600 includes a file 20 user interface (UI) checkbox change 601 and a file 35 user interface (UI) table change 602. In the example, file 20 change is a file update 1, changing the relevant code to version 10 (V10), and file 35 update is file update 2, changing file 35 code to version 8 (V8). The continuous interface continuous deployment tool processes the code change commit 5 600 and the code commit facility detects a failure, such as a deployment failure 604. The code commit facility (or intelligent robotic process automation (RPA)) modifies and/or creates an ad hoc code change package deployment with only a failing file specific rollback, such as described herein 606. As explained, in one or more embodiments, the code commit facility automatically analyzes and identifies, for instance, that the code change for file 35 is causing the deployment failure, and as such, rolls back the file 35 code to version 7 (V7) 602', while allowing the code change for file 20 (update 1) version 10 (V10) 601 to proceed as part of the revised code change commit 5a package 600' to be deployed by the continuous integration continuous deployment tool into the target computing environment.

Figure 7A:
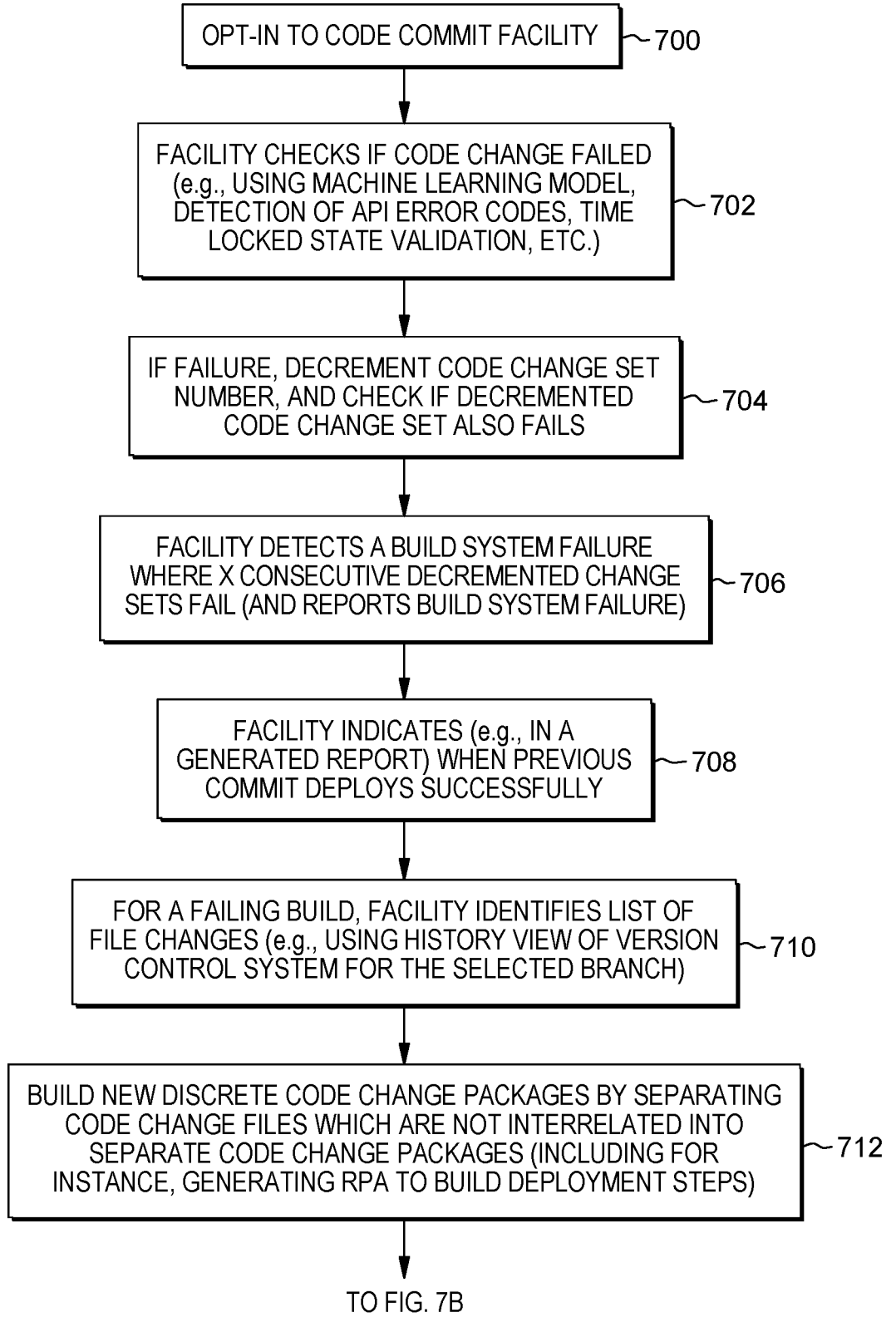
FIGS. 7A-7B depict another example of a code commit facility workflow, in accordance with one or more aspects of present disclosure.
Figure 7B:
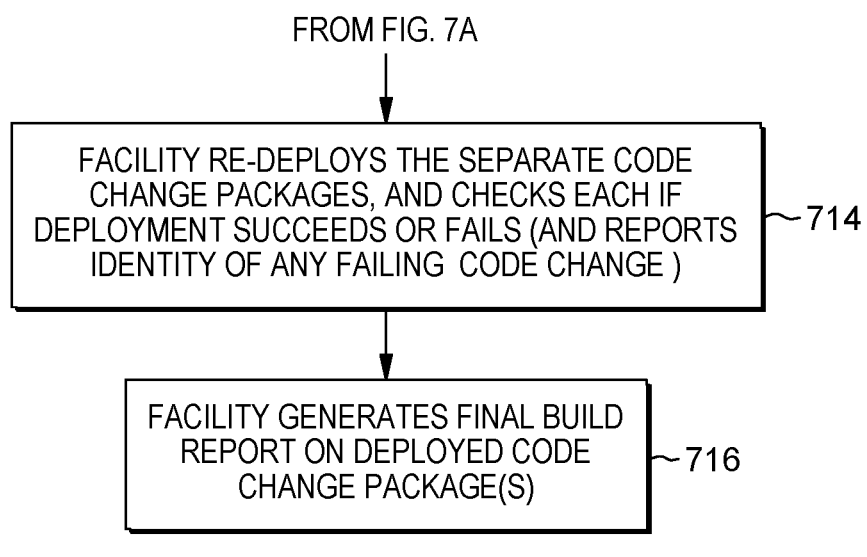

FIGS. 7A-7B depict another embodiment of a code commit facility workflow, in accordance with one or more aspects of present disclosure. In the embodiment depicted, one or more systems, such as one or more developer systems opt-in or register to use the code commit facility. In some embodiments, the code commit facility or processing disclosed herein includes registering users with the facility (or system) to facilitate the processing. For instance, in one or more embodiments, the code commit process can begin with, or be in response to, receiving permission from one or more user systems, developer systems, etc., for data collection relevant to one or more of the computer-based processes disclosed, and include registering the user, developer, etc., with the code commit facility or system. To the extent implementations of the present disclosure collect, store, or employ confidential information provided by, or obtained from, a user, developer, etc. (such as previous code changes, historical code data, and other user data from one or more data sources, such as various platforms, applications, systems, etc., relevant to the user or developer carrying out a current or specified code change for a software application, etc.), such information is to be used in accordance with all applicable laws concerning protection of personal information. Additionally, the collection, storage, and use of such information may be subject to consent of the individual to such activity, for example, through "opt-in" or "opt-out" processes, as may be appropriate for the situation and the type of information. Storage and use of confidential information is in an appropriately secured manner reflective of the type of information, for example, through various encryption techniques for sensitive information. Once the one or more systems or users opt-in or register with the code commit facility, the code commit process retrieves, in one embodiment, the previous commit, and re-triggers the build and deploy processing.

In one or more embodiments, the code commit facility checks if a code change failed within the build system or deployment system 702. By way of example, in one or more embodiments, checking by the facility whether the code change fails can include using a machine learning model such as described herein, and/or detecting one or more application programing interface (API) error codes, using time locked state validation, etc. If a failing code change is detected, the code commit facility decrements, in embodiments, the code change set number, and checks if the decremented code change set also fails 704. In one or more embodiments, the code commit facility identifies or detects a build system failure where x consecutive decremented change sets fail 706. In one implementation, the number (x) of failing decremented change sets before detecting a build system failure can be pre-specified, such as by a system user. Once detected, the code commit facility generates and sends a report (e.g., to one or more developer systems) indicating that there is a build system failure.

In one or more embodiments, the code commit facility indicates, such as in a generated report, when the previous commit(s) deploys successfully 708, indicating that the failing code change is likely not a build system failure. For a failing build, the code commit facility identifies a list of file changes in the failing build 710. For instance, the list of file changes can be ascertained via the history view of the version control system for the selected branch, that is, for the selected branch with the code change. In one example, the code commit facility can detect which files are interrelated using static analysis. For instance, in one embodiment, the facility can detect that two files are related or connected because one file (introduced in the chain set) is imported using an import keyword in the first file whose content is also changed in the specified commit. The code commit facility builds or generates discrete test code change packages by separating code change files which are not interrelated into separate code change packages 712. This process can include, for instance, generating a robotic process automation (RPA) to build the desired deployment steps. In one example, the process can generate a user attended RPA or an unattended RPA to manually or automatically build the deployment steps by, for instance, filling out a known user interface for the deployment process (e.g., for a low code deployment embodiment). This process is advantageous since as a result of branch development, developer systems can merger multiple features into a single commit, and by grouping the changed files based on their dependencies, the facility seeks to separate features of the application. For instance, in one or more embodiments, a failure issue can most likely be related to a specific feature (e.g., one or more change files), and not necessarily related to an entire commit package. A value of the code commit facility is that it allows sub-assets to be de-incremented, rather than the application at large.

As illustrated in FIG. 7B, in one or more embodiments, the code commit facility deploys (or re-deploys) the separate code change packages, and checks if each deployment succeeds or fails, and reports if there are any failing code change packages 714. In this manner, the code commit facility evaluates the code change package at a code file level, rather than at the commit or package level. The code commit facility, in one or more embodiments, generates a final build report on the deployed code change package(s) 716. As described above in connection with FIG. 6, the deployed code change package(s) can be a modified version or a newly created version of the failing code change commit or package.

Figure 8:
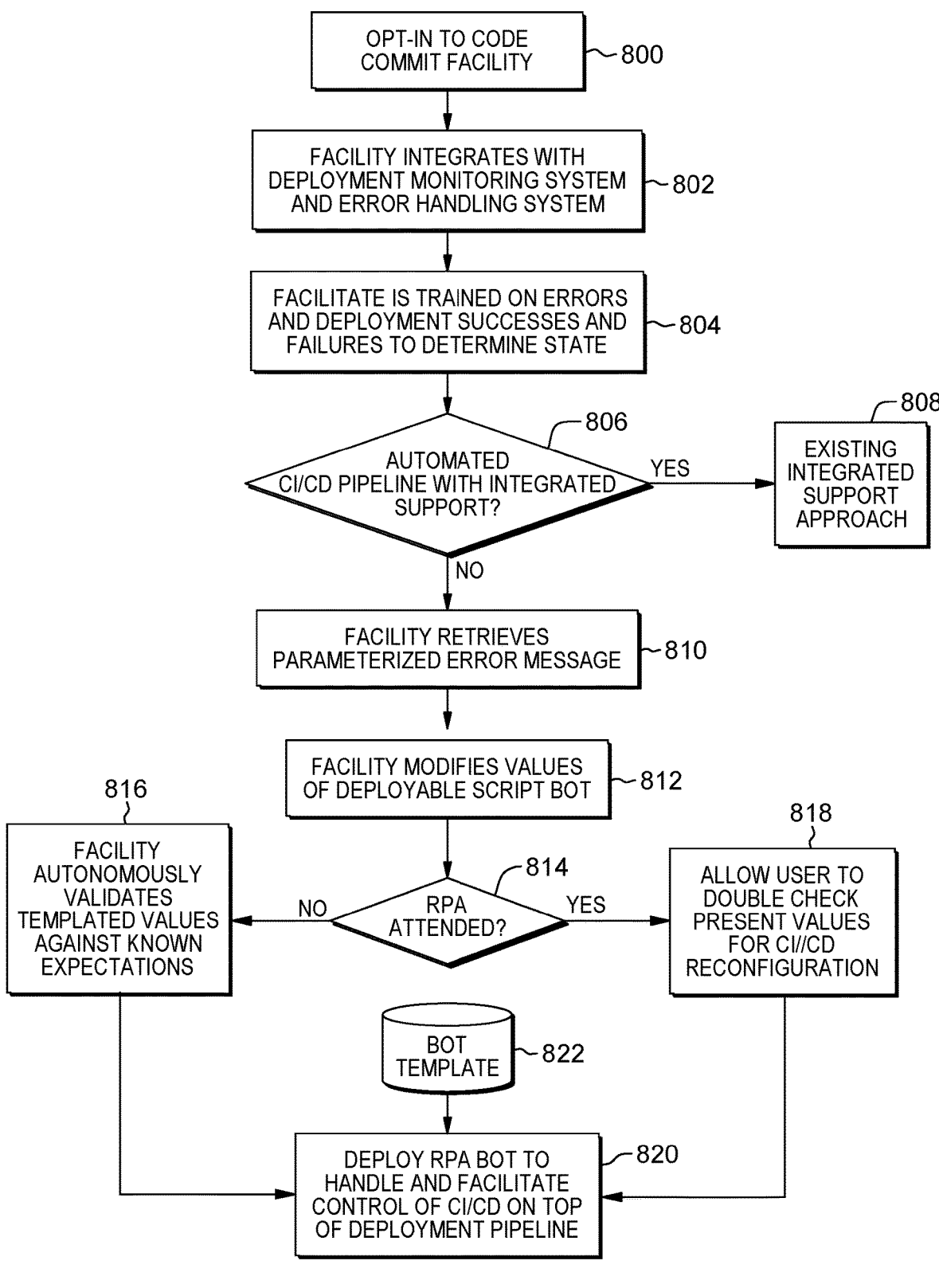
FIG. 8 depicts a further embodiment of a code commit facility workflow, in accordance with one or more aspects of present disclosure.

FIG. 8 depicts a further embodiment of a code commit facility workflow, in accordance with one or more aspects of present disclosure. As illustrated in FIG. 8, in one or more embodiments, the process can include an opt-in to the code commit facility 800, such as described in connection with the opt-in process of FIGS. 7A-7B. In one or more embodiments, the code commit facility integrates with a deployment monitoring system and/or error handling system of, for instance, a continuous integration continuous deployment system and/or a target system to receive or detect the code change 802.

In one or more embodiments, the code commit facility is trained on errors and deployment successes and failures to be able to ascertain state (succeed or fail) of a code change commit 804. In one or more embodiments, the code commit facility determines whether the automated continuous integration continuous deployment pipeline includes integrated support to address a code change failure 806, and if "yes", then the process uses the existing integrated support approach of the continuous integration continuous deployment pipeline 808.

Assuming that the automated continuous integration continuous deployment pipeline does not include integrated support for addressing failing code changes, the code commit facility retrieves, in one or more embodiments, a parameterized error message for the code change 810 from, for instance, the continuous integration continuous deployment system and/or the target environment. The code commit facility modifies, in one embodiment, one or more values of a deployable script bot 812 (e.g., a robotic process automation (RPA) bot). The facility determines, in one embodiment, whether the RPA is a user attended RPA 814, and if "yes", then allows the user to double check the present values for the continuous integration continuous deployment reconfiguration 818, before deploying the RPA bot to handle and facilitate control of the continuous integration continuous deployment system on top of the deployment pipeline 820, where deploying the RPA bot can, in one or more embodiments, reference a bot template 822 in a repository accessible by the code commit facility. In one or more embodiments, where the RPA is unattended, the code commit facility autonomously validates the templated values against known expectations 816, and deploys the RPA bot to handle and facilitate code commit control (such as disclosed herein for) the continuous integration continuous deployment on top of the pipeline 820.

Those skilled in the art will know from the above description that provided herein are computer-implemented methods, computer program products, and computer systems for facilitating processing within a computing environment, and more particularly, for providing a code commit facility to operatively coupled to a continuous integration/continuous deployment tool or system for more effective automated build and deployment of software application updates by, for instance, providing a more detailed view and a specific reason why a build process has failed or an automated code change has failed. In one or more embodiments, application execution continuity is enhanced by minimizing or eliminating downtime resulting from a failed code change, and/or by enriching a failure report to more quickly identify a particular failing code change, or a code file at issue. In one or more aspects, the code commit processing disclosed herein provides one or more enhanced reports for certain types of build and deployment systems, such as the increasingly popular low code development platforms, to provide the redundancy and safety of a full continuous integration continuous deployment pipeline.

In one or more embodiments, automatic analysis of build and/or deployment issues is provided by the facility, which can then recommend, for instance, location of the issue by providing a list of potential source code files causing the issue. Further, the disclosed facility is particularly advantageous for DevOps pipelines which do not have a continuous integration continuous deployment integration support. The automatic detecting of code change failures of a build system is especially useful for proprietary software development technologies, such as low code platforms. In addition, disclosed herein is a code commit facility to enhance a continuous integration continuous deployment pipeline to provide, on top of the pipeline, software application health monitoring and diagnosis. In one or more aspects, a code commit facility, module or process is provided for operatively coupling to an automated continuous integration/continuous deployment system to facilitate continuous updating and deployment of software application code changes within the computing environment, as well as handling of any failing code change. The code commit facility disclosed reduces downtime in the case of a code change failure by, for instance, allowing one or more non-failing files of the code change set to proceed while rolling back one or more identified failing files of the code change set. Advantageously, the code commit processing disclosed reduces analysis time and facilitates understanding of a root cause of a code change issue, such as a code change build or deployment issue. In addition, the code commit processing disclosed can facilitate identify and signal existence of a build system failure (when present) that resulted in a particular code change build or deployment issue.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

operatively coupling a code commit facility to a continuous integration continuous deployment system, the code commit facility assisting in addressing a failing code change during updating of a software application by the continuous integration continuous deployment system, the code commit facility comprising:

generating discrete code change packages from the failing code change, the generating of the discrete code change packages including separating independent code change files of the failing code change into the discrete code change packages;

deploying the discrete code change packages in a target environment using the continuous integration continuous deployment system;

based on the deploying in the target environment, detecting a failing discrete code change package of the discrete code change packages; and rolling back, based on detecting the failing discrete code change package, one or more code change files of the failing discrete code change package absent rolling back one or more other code change files of one or more other discrete code change packages to restructure the failing code change for deployment using the continuous integration continuous deployment system.

2. The computer-implemented method of claim 1, wherein the code commit facility further comprises, based on initiating a build and deploy process within the continuous integration continuous deployment system for a code change, determining presence of the failing code change in the target environment.

3. The computer-implemented method of claim 2, wherein the code commit facility further comprises training a machine learning model to facilitate detecting failing code changes, and wherein the determining includes using the machine learning model in detecting the failing code change.

4. The computer-implemented method of claim 2, wherein the code commit facility further comprises, based on determining presence of the failing code change, deploying a prior code change with a prior code change version number from a code change version number of the failing code change, and based, at least in part, on the deploying of the prior code change also failing, signaling a build system issue with the continuous integration continuous deployment system.

5. The computer-implemented method of claim 2, wherein the code commit facility further comprises ascertaining, based on determining presence of the failing code change, a set of code change files of the failing code change, and wherein the separating independent code change files is based on the ascertained set of code change files of the failing code change.

6. The computer implemented method of claim 5, wherein ascertaining the set of code change files of the failing code change comprises using a history view of a particular software application branch of the code change, the history view being obtained from a version control facility of the continuous integration continuous deployment system.

7. The computer-implemented method of claim 1, wherein the detecting further comprises evaluating the discrete code change package deployments to the target environment and ascertaining therefrom the failing discrete code change package of the discrete code change packages.

8. The computer-implemented method of claim 1, wherein the code commit facility further comprises analyzing, via data analysis, the failing code change and generating a report on the failing code change based on the data analysis.

9. The computer-implemented method of claim 1, wherein at least one of the generating, deploying, detecting and rolling back is implemented as a robotic process automation-based add-on for the continuous integration continuous deployment system.

10. A computer program product for facilitating processing within a computing environment, the computer program product comprising:

a set of one or more computer readable storage media; and program instructions, collectively stored in the set of one or more readable storage media, for causing at least one processor set to perform computer operations comprising:

operatively coupling a code commit facility to a continuous integration continuous deployment system, the code commit facility assisting in addressing a failing code change during updating of a software application by the continuous integration continuous deployment system, the code commit facility comprising:

generating discrete code change packages from the failing code change, the generating of the discrete code change packages including separating independent code change files of the failing code change into the discrete code change packages;

deploying the discrete code change packages in a target environment using the continuous integration continuous deployment system;

based on the deploying in the target environment, detecting a failing discrete code change package of the discrete code change packages; and rolling back, based on detecting the failing discrete code change package, one or more code change files of the failing discrete code change package absent rolling back one or more other code change files of one or more other discrete code change packages to restructure the failing code change for deployment using the continuous integration continuous deployment system.

11. The computer program product of claim 10, wherein the code commit facility further comprises, based on initiating a build and deploy process within the continuous integration continuous deployment system for a code change, determining presence of the failing code change in the target environment.

12. The computer program product of claim 11, wherein the code commit facility further comprises training a machine learning model to facilitate detecting failing code changes, and wherein the determining includes using the machine learning model in detecting the failing code change.

13. The computer program product of claim 11, wherein the code commit facility further comprises, based on determining presence of the failing code change, deploying a prior code change with a prior code change version number from a code change version number of the failing code change, and based, at least in part, on the deploying of the prior code change also failing, signaling a build system issue with the continuous integration continuous deployment system.

14. The computer program product of claim 11, wherein the code commit facility further comprises ascertaining, based on determining presence of the failing code change, a set of code change files of the failing code change, and wherein the separating independent code change files is based on the ascertained set of code change files of the failing code change.

15. The computer program product of claim 14, wherein ascertaining the set of code change files of the failing code change comprises using a history view of a particular software application branch of the code change, the history view being obtained from a version control facility of the continuous integration continuous deployment system.

16. The computer program product of claim 10, wherein the code commit facility further comprises analyzing, via data analysis, the failing code change and generating a report on the failing code change based on the data analysis.

17. A computer system for facilitating processing within a computing environment, the computer system comprising:
  at least one processor set;
  a set of one or more computer readable storage media; and
  program instructions, collectively stored in the set of one or more computer readable storage media, for causing the at least one processor set to perform computer operations comprising:
    operatively coupling a code commit facility to a continuous integration continuous deployment system, the code commit facility assisting in addressing a failing code change during updating of a software application by the continuous integration continuous deployment system, the code commit facility comprising:
  generating discrete code change packages from the failing code change, the generating of the discrete code change packages including separating independent code change files of the failing code change into the discrete code change packages;
  deploying the discrete code change packages in a target environment using the continuous integration continuous deployment system;
  based on the deploying in the target environment, detecting a failing discrete code change package of the discrete code change packages; and
  rolling back, based on detecting the failing discrete code change package, one or more code change files of the failing discrete code change package absent rolling back one or more other code change files of one or more other discrete code change packages to restructure the failing code change for deployment using the continuous integration continuous deployment system.

18. The computer system of claim of 17, wherein the code commit facility further comprises:
  based on initiating a build and deploy process within the continuous integration continuous deployment system for a code change, determining presence of a failing code change in the target environment;
  training a machine learning model to facilitate detecting failing code changes; and
  the determining including using the machine learning model in detecting the failing code change.

19. The computer system of claim 17, wherein the code commit facility further comprises:
  based on initiating a build and deploy process within the continuous integration continuous deployment system for a code change, determining presence of the failing code change in the target environment; and
  based on determining presence of the failing code change, deploying a prior code change with a prior code change version number for a code change version number of the failing code change, and based, at least in part, on the deploying of the prior code change also failing, signaling a build system issue with a continuous integration continuous deployment system.

20. The computer system of claim 17, wherein the code commit facility further comprises:
  based on initiating a build and deploy process within the continuous integration continuous deployment system for a code change, determining presence of the failing code change in the target environment; and
  ascertaining, based on determining presence of the failing code change, a set of code change files of the failing code change, and wherein the separating independent code change files is based on the ascertained set of code change files of the failing code change.

* * * * *